March 23, 1926.

G. S. WEST

COTTON HARVESTER

Filed April 23, 1921

Inventor
George S. West.
By
Attorney

March 23, 1926.

G. S. WEST 1,578,224

COTTON HARVESTER

Filed April 23, 1921   4 Sheets-Sheet 4

Inventor
George S. West.
Attorney

Patented Mar. 23, 1926.

1,578,224

UNITED STATES PATENT OFFICE.

GEORGE S. WEST, OF BALTIMORE, MARYLAND.

COTTON HARVESTER.

Application filed April 23, 1921. Serial No. 464,003.

*To all whom it may concern:*

Be it known that I, GEORGE S. WEST, a citizen of the United States, residing at Baltimore, in the State of Maryland, have invented certain new and useful Improvements in Cotton Harvesters, of which the following is a specification.

My said invention relates to a device for gathering cotton from cotton plants and comprises a device or devices which may be supported on a wagon for transportation about a field.

It is an object of my invention to provide a picking or gathering device which shall be light and easily handled so that it may be carried by the operator where this is desirable or necessary.

A further object of my invention is to provide improved means on such a device for removing the cotton from the bolls.

Another object of my invention is to provide improved means for removing the cotton from the pickers after they have separated it from the plant.

A further object is to provide means whereby the ripe cotton may be removed from the open bolls without serious damage to the unopened or partly opened bolls or to the plant structure.

A further object of my invention is to provide means for removing cotton from bolls which are cracked or only partially opened.

Referring to the accompanying drawings which are made a part hereof and on which similar reference characters indicate similar parts.

Figure 5 is an elevation, partly in section of one of the gathering spindles and its driving and guiding devices, Figure 6 is an end view of the gathering spindle.

Figure 7 is a plan of the device shown in Figure 5,

Figure 8 a section on line 8—8 of Figure 2 looking in the direction of the arrows, and Figure 9 a section on line 9—9 of Figure 8 looking in the direction of the arrows.

In the drawings reference character 10 indicates the body of a wagon or other vehicle having a deep box and having at its sides and rear end brackets 11 in which swinging supports 12 are held on steps 12'. Each support is or may be hollow and carries at its upper end an arm 13 held in place by a brace 14 and carrying at its outer end a pulley 15. A second pulley 16 is mounted on the upper end of the support 12 and a cord 17 passes over the pulleys. This cord has at one end inside the tube, a weight 18 and at the other end a hook 19, the latter being adapted to engage an eye 20 on the gathering device generally indicated by reference character 21. I may, if desired, provide a spring 22 between the cord and the hook and this may take the place of the weight 18 or supplement its action or a spring may be located in the tube 12. The wagon also carries a gasoline engine 23 which drives a generator 24 to provide power for operating the fan motor 25. This engine may also furnish power for driving the gathering mechanisms hereinafter described, or they may be driven by electric or other power. A fan in the casing 26 driven by the motor provides suction which acts through a pipe 27 running lengthwise of the wagon to draw the cotton from the gathering devices through lengths of flexible tubing 28 attached in any convenient manner to coupling devices provided along the pipe 27 as at 29 and 30. The cotton drawn through pipe 27 is forced along a pipe 31 and discharged into the body of the wagon through any one of a series of pipes 32. These pipes 32 are provided with dampers 33, the rearmost one of which is shown open in Figure 1 while the remaining ones are closed and the cotton will therefore be discharged through the rearmost pipe into the rear portion of the wagon body at this time.

The gathering device may have handles as shown at 34 and 35 for manipulating it when supported on a wagon as shown and the entire device may be moved up or down against the tension of the spring or weight or both, or it may be tilted on the hook 19 as a pivot as will be evident. In this way the picking elements may be caused to engage only the portion of the plant having ripened and open bolls and preferably an operator will so manipulate the device as to gather the cotton from one side of each of two rows between which he is traveling. Thus two operators will follow the wagon, one in each wheel track, and these with two operators at each side of the wagon may gather the cotton from a space equal to a total of six rows at each traverse across the field. In such a case the lateral arms 13 will preferably be of different lengths so that the outer pulley 15 of each may stand midway between its two rows and so bear the weight of the gathering device 21. The structure of the wagon is conventional and this as well as the supporting and conveying means described may be changed in many ways.

The gathering device 21 may, as above stated, be borne on the wagon or may be carried by the operator in which latter case it is desirable to provide a strap passing from the eye 20 over the shoulder of the operator and down to the eye 20 or to a second eye fixed to the rear portion of the device. A spring like that at 22 may be placed in the strap or at one or both ends of the same. Preferably the gathering device will have an outer casing and this should be of a skeleton form and should be made of aluminum or other light material to keep the weight as low as possible. The casing may be made in any desired form but I have shown a preferred form in which a central section 36 has portions of the opposite sides cut away to leave vertically extending end and intermediate portions 37. At the forward end this section has bolted to it two side pieces 38 which provide guiding and bearing devices for various moving parts. A pair of curved track members 39, 39 are attached to members 38, 38 by cross pins 40, 41 and 42 and bear with their rear ends against uprights 37. Triangular pieces 43 are placed in the angles between members 39 and 36 and riveted to each of them. At the rear end, an extension 44 which may be divided longitudinally or otherwise is attached to the central section and likewise supports moving parts of the mechanism.

The forward end of the casing supports sets of rollers 45 and 45' over which passes the sprocket chain 46 carrying spindles 47. At the rear end of the casing this chain is supported and driven by a shaft 48 carrying sprocket gears 49 (Fig. 8) engaging the chain and also carrying a gear 50 whose teeth mesh with those of a pinion 51. This pinion is driven by a gear 52 coaxial with a pinion 53 driven by a gear 54, which in turn is driven by a spring 55 attached to a housing 56 on the gear and to a shaft 57. A crank 58 serves for winding the spring motor, and retrograde movement is prevented by a pawl 59 engaging a ratchet 60.

The shaft 48 has at one end a disk 61 carrying a pivoted bar 62. This bar has attached thereto a strap brake 63 extending about a boss 64 held from rotation by a pin 65 on the frame engaging a hole 65' in the boss, which may be integral with the frame if preferred. Springs 66 normally hold the brake in released position, the bar resting against a pin 67. When the spring motor starts to rotate the disk 61 and intermediate mechanism centrifugal force acting on a weight 68 and through this on the brake will tighten the strap about the boss 64 and tend to retard the drive. As the motor runs down it will drive more slowly and the braking action will gradually be relieved. Weight 68 is adjustable along the bar 62 to vary the braking effect.

Figures 2, 3, 10:
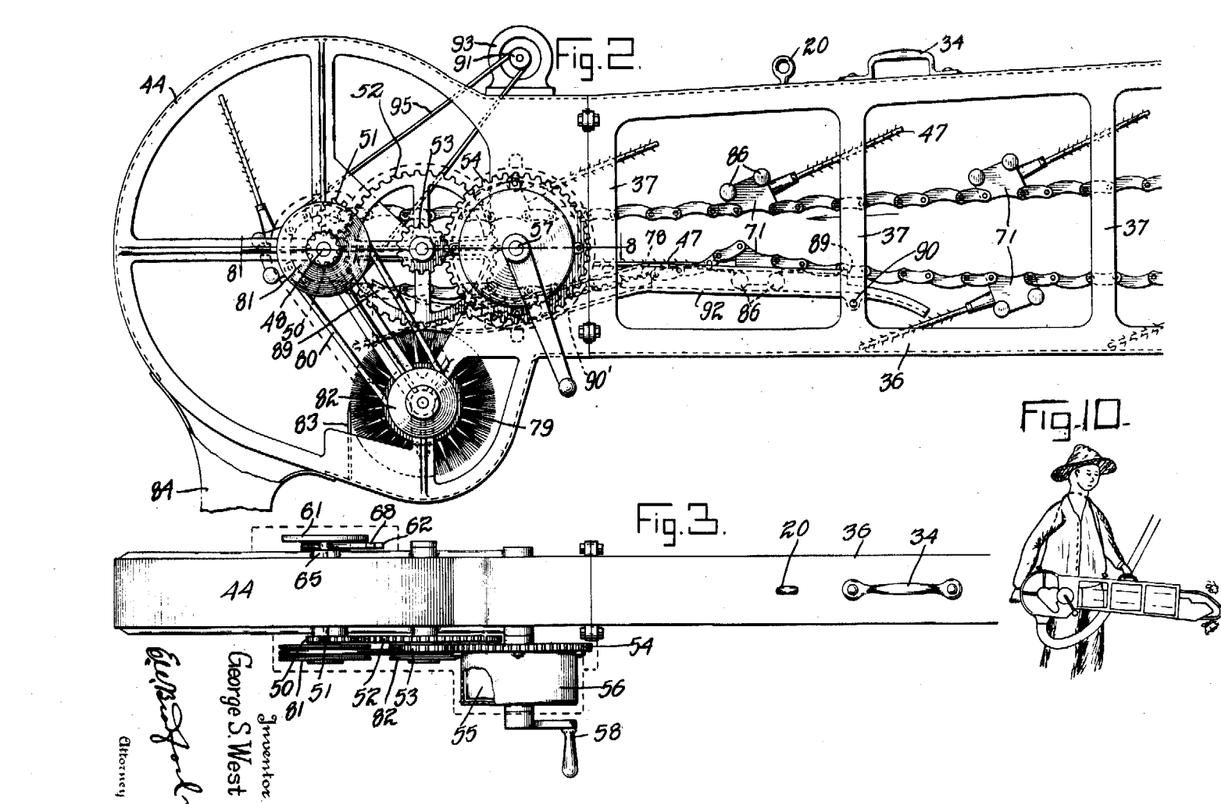
Figures 2 and 2ª taken together show a side elevation of my gathering device.
Figures 3 and 3ª taken together show a plan of the same.
Figure 2:
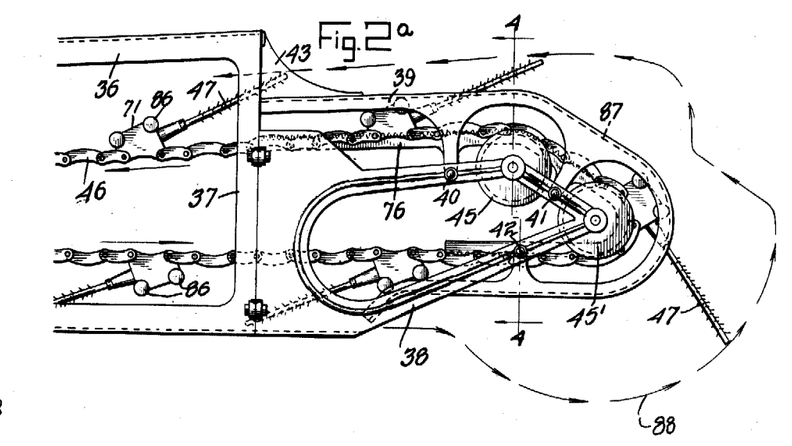
Figure 3:
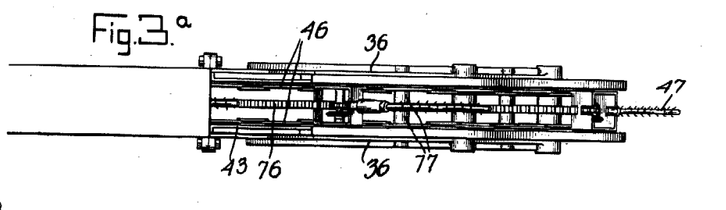

The individual pickers comprise spindles 47 carrying bent pins 70 (Figs. 5 and 6) arranged in rows along the spindle, all the pins being inclined in the same direction. Each spindle is carried in a housing 71 on a link of the chain and has at its rear end a pinion 72 meshing with a pinion 73 carried by a shaft 74. This shaft also carries a pinion 75 adapted to mesh with a rack 76 at the forward end of the gathering device to rotate the spindle in the direction of the arrow in Figure 6 as it comes into engagement with the cotton. The rack is approximately J-shaped and is located as indicated in Figure 2ª with its upper leg running back to the first cross member 37. By this arrangement the operator is enabled to pick cotton from bolls in any position since he can reach down to the ground and use a forwardly moving spindle or he can use a rearwardly traveling spindle for reaching up to a boll that hangs down, while he can of course move the entire device freely in all directions to reach forward and back and sidewise.

The rack is supported by pins 40, 41 and 42, spacers 77 extending between the rack and the sides of the casing member 39. These spacers on pin 42 may also act as anti-friction rollers for chain 46. At the rear of the casing is a second rack 78 (Figs. 2 and 8) which rotates the spindles in the opposite direction to the rotation caused by rack 76. This rack extends forward from a point above a rotating brush 79 and is slightly curved so that the spindle may be forced against the brush and may remain so for some time. The rotary brush is driven by a belt 80 passing over a pulley 81 on shaft 48 and a pulley 82 which drives the brush in a direction to strip the cotton from the spindles. In this manner the cotton is caused to be unwound or unwrapped from the spindle and is carried away by the brush as fast as it is unwrapped. Preferably this brush is composed of rows of tufts of wire bristles alternating with rows of stiff natural bristles such as hog bristles.

A stripper-plate 83 is placed at the rear of the brush to assist in removing the cotton therefrom. Just back of the stripper plate is a nozzle or extension 84 on the casing 44 to which a flexible tube 28 is attached to draw out the cotton as it is supplied. The sides of the casing are preferably enclosed by cheek pieces 85 (Fig. 1) only a small opening being left at the lower front corner of each cheek-piece through which air is drawn. Escape of the cotton is thus prevented and the effectiveness of the draft increased.

Figure 1:
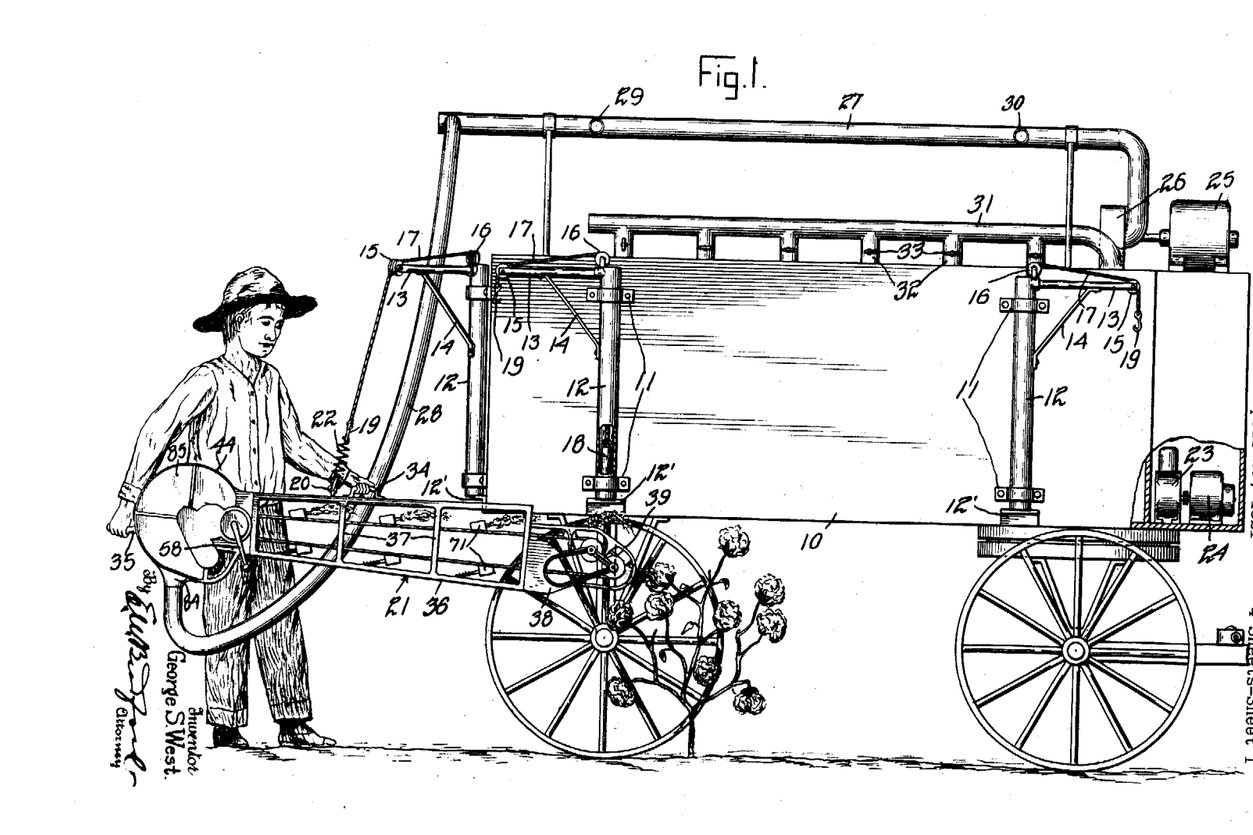
Figure 1 shows an elevation of a vehicle supplied with my improved gathering devices, said vehicle being also provided with means for elevating the cotton and distributing it throughout the body of the same.
Figure 4:
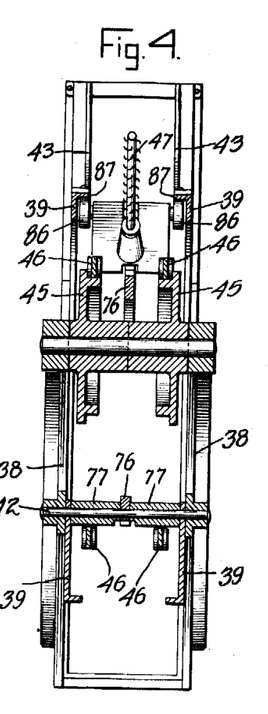
Figure 4 is a section on line 4—4 of Figure 2ª.

Each of the spindle housings carries a pair of rollers 86 at opposite sides of the space between track members 39, through which the racks 76 extend into engagement with pinions 75. These rollers engage tracks consisting of a pair of flanges 87 at the front of the device on track members 39 to insure engagement of the racks and pinions and to prevent the spindles from sidewise movement out of their normal plane of travel. The ends of the spindles follow the path indicated in dotted lines at 88 and the spindles have but a slow movement of translation in passing through, or alongside of a plant. From here the spindles pass between hullguards 43 which detach any bolls or parts thereof that may adhere to the spindles. Then they pass, as shown in Figure 1, to the rear of the device, where the spindles are reversely rotated and have their load removed by brush 79. After the spindle with its load has reached the neighborhood of the rotary brush 79, rollers 86 will engage a track comprising flanged side portions 89 fast to the casing as at 90 and joined for a short distance at 90' by a transverse bottom portion, the bent-over flanges of the side members forming a track for the rollers 86 in like manner to flanges 87 (Fig. 4) and acting to hold the spindles down against the brush to insure that all the cotton will be removed from the spindles. The spindles normally extend at an angle of 15° to the travel of the chain and this guide bends the chain somewhat, carrying the spindles in nearly a straight path while firmly pressed into contact with the rotary brush and rotated by the rack and pinion. After leaving the brush the spindles are raised into a horizontal position by the straight part of the tracks at 92 and so held above the rack 78 and the transverse bottom member 90'. The rack 78 is preferably, but not necessarily integral with members 89 and 90'.

Figures 5, 6, 7, 8, 9:
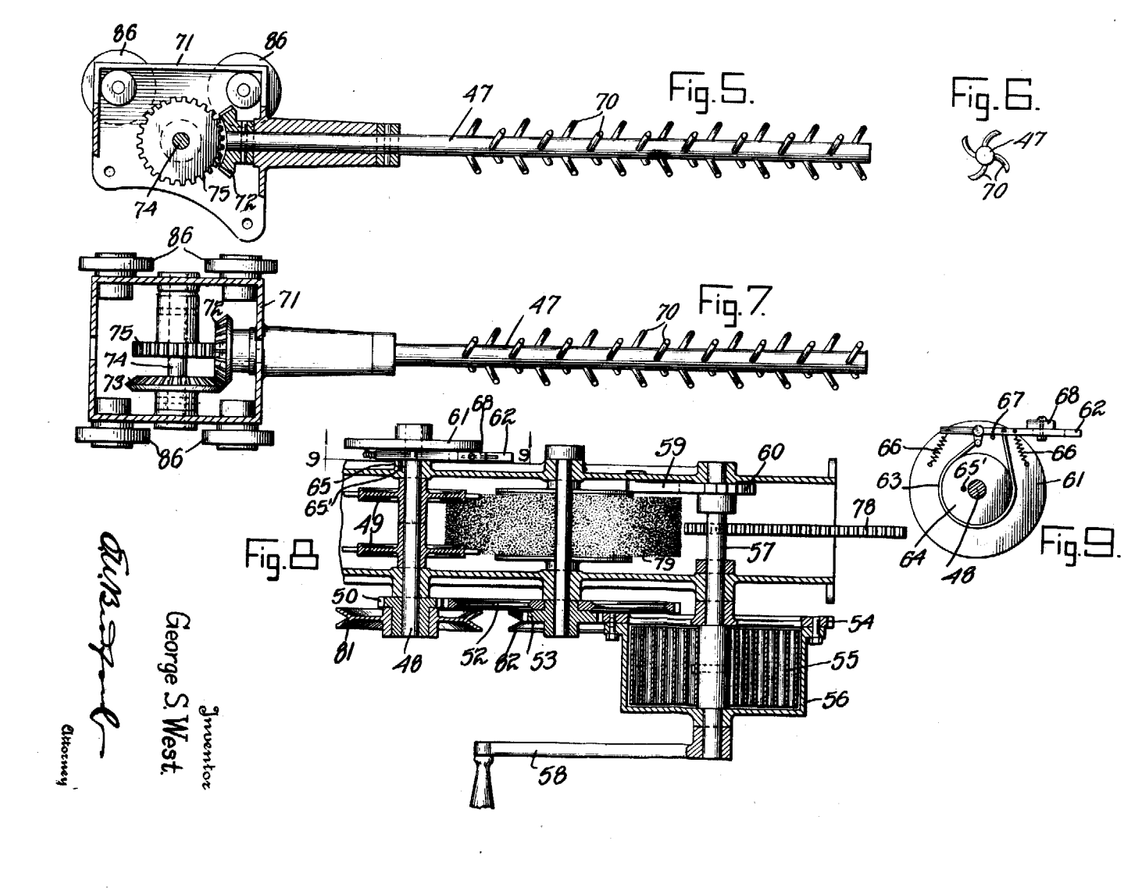

A modified form of the spindle shown in Figures 6 and 7 is intended to be used when the bolls are not fully open as in the case of the frost-bitten or sun-cracked bolls. In this case the spindle which is to be substituted for spindle 47 in use has very short teeth which may be either straight or curved. By reason of the shortness of the teeth the extreme diameter of the spindle is small and it may readily enter between the segments of the bolls. At the same time the rotation of the spindle will cause the points to engage the cotton and withdraw it.

It will be evident to those skilled in the art that my device may be modified in many other respects without departing from my invention. For example I may hold the supports 12 and arms 13 rigidly in adjusted position by making bearings 11 adjustable so that they may act as clamps, and may vary the form and arrangement of parts in many other ways. I have shown in Figure 2 an electric motor 93 arranged on the casing to drive the gathering device by means of pulley 81, pulley 94 and belt 95. The spring motor or so much thereof as necessary may be removed when an electric motor is used. I do not limit myself therefore to what is shown in the drawings or described in the specification but only as indicated in the appended claims.

Having thus fully described my said invention, what I claim as new and desire to secure by Letters Patent, is:

1. In a cotton picking mechanism, an endless carrier, a series of spindles carried thereby each spindle being rearwardly inclined relative to its direction of travel, means at one end of the mechanism to rotate said spindles and thereby wind the cotton on the spindles, and means at a distance therefrom for reversely rotating the spindles to unwind the cotton, substantially as set forth.

2. In a cotton picking mechanism, an endless carrier, a series of rearwardly inclined thereby, means at one end of the mechanism to rotate said spindles and thereby wind the cotton on the spindle, means at a distance therefrom for reversely rotating the spindles to unwind the cotton, and means adjacent thereto for removing the cotton from the spindles as it is unwound, substantially as set forth.

3. In a cotton picking mechanism, an endless carrier, a series of spindles carried thereby, means at one end of the mechanism to rotate said spindles and thereby wind the cotton on the spindles, means at a distance therefrom for reversely rotating the spindles to unwind the cotton, a brush adjacent thereto for removing the cotton from the spindles as it is unwound, and guarding means at the front of the device to remove burrs and leaves from the spindles, substantially as set forth.

4. In a cotton picking mechanism, an endless carrier, a series of spindles carried thereby, means at one end of the mechanism to rotate said spindles and thereby wind the cotton on the spindles, means at a distance therefrom for reversely rotating the spindles to unwind the cotton, a brush adjacent thereto for removing the cotton from the spindles as it is being unwound, and means adjacent said brush to force the spindles against it, substantially as set forth.

5. A cotton picking mechanism comprising a manually-controlled frame, picking spindles thereon, means for propelling them in an endless path, means at one point of the path for rotating them in one direction to remove cotton from the bolls, means at a distance from said point for rotating them reversely to remove the cotton from the spindles, and a motor on the frame for driving the propelling means, substantially as set forth.

6. A cotton picking mechanism comprising a manually-controlled frame, picking spindles thereon, means for propelling them in an endless path, means at one point of the path for rotating them in one direction to remove cotton from the bolls, means at a distance from said point for rotating them reversely to remove the cotton from the spindles, a spring motor for driving the propelling means, and means for regulating the speed of the motor comprising a centrifugal brake, substantially as set forth.

7. A cotton picking mechanism comprising a manually-controlled frame, picking spindles thereon, means for propelling them in an endless path, means at one point of the path for rotating them in one direction to remove cotton from the bolls, means at a distance from said point for rotating them reversely to remove the cotton from the spindles, a spring motor for driving the propelling means, and means for regulating the speed of the motor comprising a boss on the fixed frame, a disk on a driven shaft, and a centrifugal brake carried by the disk and adapted to act on the boss, substantially as set forth.

8. A cotton picking mechanism comprising a manually controlled frame, a sprocket chain thereon, housings on certain of the links of the chain, spindles in said housings, a motor on the frame, connections from the motor for propelling the chain and the spindles supported thereby in an endless path, and means for driving said spindles in reverse directions at different times to wind on cotton from the bolls and to unwind cotton therefrom comprising a pinion in each housing having driving connections to its spindle and spaced racks adjacent the path of the pinions for driving them alternately in opposite directions, substantially as set forth.

9. A cotton picking mechanism comprising a curved support, an endless carrier thereon, means whereby the carrier may be moved, spindles on the carrier rearwardly inclined relatively to the direction of travel of the carrier, pinions fast to the spindles for driving them, and a rack at one end of the support to rotate the spindles as they move along the support whereby the movements of rotation and translation act simultaneously to draw the cotton out of the bolls with a pulling and twisting action, substantially as set forth.

10. A cotton picking mechanism comprising a curved support, an endless carrier thereon, means whereby the carrier may be moved, spindles on the carrier rearwardly inclined relatively to the direction of travel of the carrier, pinions fast to the spindles for driving them, and a rack at one end of the support to rotate the spindles as they move along the support whereby the movements of rotation and translation act simultaneously to draw the cotton out of the bolls with a pulling and twisting action, the rack being curved to vary such action at different stages of the travel of the spindles, substantially as set forth.

11. A cotton picking mechanism comprising a curved support, an endless carrier thereon, means whereby the carrier may be moved, spindles on the carrier rearwardly inclined relatively to the direction of travel of the carrier, pinions fast to the spindles for driving them, and a rack at one end of the support to rotate the spindles as they move along the support whereby the movements of rotation and translation act simultaneously to draw the cotton out of the bolls with a pulling and twisting action, the rack being curved to vary such action at different stages of the travel of the spindles, the rack comprising a lower straight portion, and inclined portion and an upper straight portion, substantially as set forth.

12. A cotton picking mechanism embodying spindles, means to rotate them to wind cotton thereon from the bolls, means to rotate them reversely and means to simultaneously rotate a brush in contact with the spindles, said brush comprising interspersed wire bristles and natural bristles, substantially as set forth.

13. A cotton picking mechanism comprising an endless carrier, an elongated support therefor, rearwardly inclined spindles flexibly mounted thereon, stripping means, and means for rotating the spindles while being stripped, substantially as set forth.

14. In a cotton picking mechanism, a manually-controlled frame, sprockets on the frame, an endless chain on the sprockets, spindles carried by certain links of the chain, rollers on said links, means adjacent one end of the frame to rotate said spindles and thereby wind the cotton thereon and guides at said end to engage the rollers and so prevent sidewise tilting of the spindles, substantially as set forth.

15. In a cotton gathering mechanism, a vehicle, a suction apparatus thereon, manually controllable gathering devices carried by said vehicle and comprising a casing, an endless carrier on the casing, spindles on the carrier, means rotating said spindles to wind cotton thereon at one part of the casing, means at another part of the casing for reversely rotating the spindles, a rotary brush engaging the spindles to assist in removing the cotton, a pipe connected to said suction apparatus and to said casing adjacent the brush, a clearing plate between the brush and the pipe and openings in the casing at the far side of the brush for admission of air thereto, substantially as set forth.

16. In a cotton gathering apparatus, a vehicle having a body, a supporting bracket carried thereby and swingable on a vertical axis said bracket having an outwardly extending arm, a cotton gathering device including a pneumatic tube extending above and beyond said bracket to force said arm alongside said body, a flexible connecting means attached to said arm and to the gathering device, and means for normally retracting said flexible device whereby said gathering device is held out of contact with the ground and close to the body of the vehicle, substantially as set forth.

17. In a cotton picking mechanism, the combination of cotton picking spindles, means for imparting a simultaneous compound movement of rotation and approximately axial translation to said spindles, and a brush acting on said spindles for removing cotton therefrom during such compound movement comprising interspersed wire bristles and natural bristles substantially as set forth.

18. A cotton picking mechanism embodying spindles, means to rotate them to wind cotton thereon from the bolls, means to rotate them reversely, and means to simultaneously apply a brush to the spindles said brush comprising interspersed wire bristles and natural bristles, substantially as set forth.

19. A cotton gathering mechanism comprising a support, a brush on the support, a series of spindles mounted to travel on the support, said spindles being inclined rearwardly with reference to their direction of travel, means whereby the spindles may be caused to travel, a brush mounted adjacent the line of travel of the spindles, means for rotating the brush to act in a direction contrary to such travel, means for rotating the spindles to collect cotton from the bolls, and means for rotating them reversely while passing said brush, substantially as set forth.

20. A cotton gathering mechanism comprising an elongated manually-controlled frame, an endless carrier adapted to travel on the frame, said carrier provided with rotary picking spindles, means whereby the carrier may be caused to travel thereon, means for guiding the carrier to cause the spindles to approach the plants in rearwardly inclined position relatively to their movement of translation in space, and means for rotating said spindles, substantially as set forth.

21. In a cotton harvester, a wagon having a closed body, a pair of pipes extending approximately from end to end of the wagon above said body, flexible suction tubes connected to one of said pipes at intervals along its length, mechanical cotton picking devices attached to said flexible tubes to feed cotton thereto, spaced brackets pivoted along the side of the wagon body, flexible means on said brackets for supporting said mechanical picking devices, branches at intervals along the other pipe leading into said body, valves for closing said branches, a fan casing communicating with both of said pipes, and a fan in the casing operative to draw air through the one pipe and force it through the other into the wagon body, substantially as set forth.

22. A cotton harvester as in claim 21, with the upper point of attachment of the tubes materially higher than that of the brackets for holding the brackets normally against the wagon body, substantially as set forth.

23. In a cotton gathering mechanism, a vehicle, elongated manually controlled cotton gathering devices carried by the vehicle, a suction tube attached to the under side of each gathering device and leading to the vehicle, spindles on said gathering devices, means whereby the spindles may be made to travel, means for rotating them at one point in a direction to wind cotton thereon, means for rotating them reversely at another point above the opening of the suction tube to unwind the cotton, and combined gravitational and pneumatic means for feeding cotton to said suction tubes, substantially as set forth.

24. A cotton picking mechanism comprising an elongated manually-controlled frame, an endless carrier on the frame provided with rotary picking spindles, means whereby the carrier may be caused to travel, means for guiding the carrier to cause the spindles to approach the plant in rearwardly inclined position, and means for rotating the spindles, substantially as set forth.

25. A cotton picking mechanism comprising an elongated frame having means whereby it may be carried by the user, sprockets adjacent opposite ends thereof, an endless chain passing over said sprockets, spindles carried thereby, a track for the spindles providing a sharp reversal of travel at the front end of the frame with a dwell as each spindle begins its backward course, and means at said end to revolve the spindles for gathering cotton, substantially as set forth.

26. A cotton picking mechanism comprising an elongated manually-controlled frame, an endless carrier on the frame provided with rotary picking spindles, means whereby the carrier may be caused to travel lengthwise of the frame, means for rotating the spindles while adjacent to the front end of the frame for picking the cotton out of the bolls, and a hull-guard on the frame past which the spindles move after performing their picking function, substantially as set forth.

27. A cotton picking mechanism comprising an elongated manually-controlled frame, an endless carrier on the frame provided with rotary picking spindles, means whereby the carrier may be caused to travel lengthwise of the frame, and means for rotating the spindles while adjacent to the front end of the frame for picking the cotton out of the bolls, substantially as set forth.

In witness whereof, I have hereunto set my hand and seal at Washington, District of Columbia, this fifth day of April, A. D. nineteen hundred and twenty-one.

GEORGE S. WEST. [L. S.]

ing an elongated manually-controlled frame, an endless carrier on the frame provided with rotary picking spindles, means whereby the carrier may be caused to travel lengthwise of the frame, means for rotating the spindles while adjacent to the front end of the frame for picking the cotton out of the bolls, and a hull-guard on the frame past which the spindles move after performing their picking function, substantially as set forth.

27. A cotton picking mechanism comprising an elongated manually-controlled frame, an endless carrier on the frame provided with rotary picking spindles, means whereby the carrier may be caused to travel lengthwise of the frame, and means for rotating the spindles while adjacent to the front end of the frame for picking the cotton out of the bolls, substantially as set forth.

In witness whereof, I have hereunto set my hand and seal at Washington, District of Columbia, this fifth day of April, A. D. nineteen hundred and twenty-one.

GEORGE S. WEST. [L. S.]

Certificate of Correction.

It is hereby certified that in Letters Patent No. 1,578,224, granted March 23, 1926, upon the application of George S. West, Baltimore, Maryland, for an improvement in "Cotton Harvesters," an error appears in the printed specification requiring correction as follows: Page 3, line 103, claim 2, after the word " inclined ", insert the words *spindles carried;* and that the said Letters Patent should be read with this correction therein that the same may conform to the record of the case in the Patent Office.

Signed and sealed this 4th day of May, A. D. 1926.

[SEAL.]
M. J. MOORE,
*Acting Commissioner of Patents.*

Certificate of Correction.

It is hereby certified that in Letters Patent No. 1,578,224, granted March 23, 1926, upon the application of George S. West, Baltimore, Maryland, for an improvement in "Cotton Harvesters," an error appears in the printed specification requiring correction as follows: Page 3, line 103, claim 2, after the word "inclined", insert the words *spindles carried;* and that the said Letters Patent should be read with this correction therein that the same may conform to the record of the case in the Patent Office.

Signed and sealed this 4th day of May, A. D. 1926.

[SEAL.]

M. J. MOORE,
*Acting Commissioner of Patents.*